(12) United States Patent
Takeishi et al.

(10) Patent No.: US 12,555,147 B2
(45) Date of Patent: Feb. 17, 2026

(54) INFORMATION PROCESSING METHOD AND STORAGE MEDIUM

(71) Applicant: TOYOTA JIDOSHA KABUSHIKI KAISHA, Toyota (JP)

(72) Inventors: Hiroki Takeishi, Machida (JP); Ai Miyata, Hirakata (JP); Koki Moriya, Nagakute (JP); Ibuki Shimada, Miyoshi (JP); Koji Ueda, Hunabashi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 28 days.

(21) Appl. No.: 18/502,968

(22) Filed: Nov. 6, 2023

(65) Prior Publication Data
US 2024/0221040 A1    Jul. 4, 2024

(30) Foreign Application Priority Data
Dec. 28, 2022    (JP) .................................. 2022-212690

(51) Int. Cl.
```
G06Q 40/00      (2023.01)
G06Q 30/0283    (2023.01)
G06Q 50/40      (2024.01)
G08G 1/00       (2006.01)
```
(52) U.S. Cl.
CPC ......... *G06Q 30/0283* (2013.01); *G06Q 50/40* (2024.01); *G08G 1/202* (2013.01)

(58) Field of Classification Search
CPC .................................................... G08G 1/202
See application file for complete search history.

(56) References Cited

U.S. PATENT DOCUMENTS

| | | | |
|---|---|---|---|
| 11,912,150 B1* | 2/2024 | Sonalker | B60L 53/65 |
| 2011/0035261 A1* | 2/2011 | Handler | B60L 53/665 |
| | | | 705/13 |
| 2019/0220812 A1 | 7/2019 | Kanaoka et al. | |
| 2019/0351783 A1* | 11/2019 | Goei | B60L 53/665 |

(Continued)

FOREIGN PATENT DOCUMENTS

| CN | 112567423 | * | 3/2021 | G06Q 50/06 |
|---|---|---|---|---|
| JP | 2019-125040 A | | 7/2019 | |

(Continued)

OTHER PUBLICATIONS

Shi et al., "An Economic Penalty Scheme for Optimal Parking Lot Utilization with EV Charging Requirements," energies, MDPI 2020 (Year: 2020).*

(Continued)

*Primary Examiner* — Abhishek Vyas
*Assistant Examiner* — William B. Bunker
(74) *Attorney, Agent, or Firm* — SoraIP, Inc.

(57) ABSTRACT

An information processing method using an information processing device, wherein when a power supply request is received from a user terminal, position information and map information of a power supply destination vehicle are acquired; if it is determined that the charging source vehicle enters the toll facility, it is determined that an additional charge will be charged, the user terminal is notified of the additional charge, and the user terminal approves the additional charge, upon detecting that, dispatching the source vehicle.

3 Claims, 6 Drawing Sheets

(56) References Cited

U.S. PATENT DOCUMENTS

| | | | | |
|---|---|---|---|---|
| 2020/0101863 A1* | 4/2020 | Westin | | B60L 53/51 |
| 2021/0046829 A1* | 2/2021 | Gaither | | G01C 21/3438 |
| 2021/0342959 A1* | 11/2021 | Benkreira | | G06Q 50/06 |
| 2024/0203253 A1* | 6/2024 | Kato | | B60L 58/13 |

FOREIGN PATENT DOCUMENTS

| | | | | |
|---|---|---|---|---|
| JP | 2020-190884 A | | 11/2020 | |
| KR | 2021-0155039 | * | 12/2021 | G01C 21/3438 |
| KR | 10-2022-0023435 A | | 3/2022 | |
| KR | 2023-0157676 | * | 11/2023 | B60L 2200/10 |
| WO | WO-2019210744 A1 | * | 11/2019 | B25J 11/00 |

OTHER PUBLICATIONS

Afshar et al., "Mobile charging stations for EV charging management in urban areas: A case study in Chattanooga," Applied Energy, 325 (2022) (Year: 2022).*
Chakraborty et al., "P2C2: Peer-to-Peer Car Charging," Department of Electrical & Computer Engineering, University of Florida, Gainesville, FL, USA 2020 (Year: 2020).*
Nio Limited, 'Nio Power', [online], 2022, [Searched on Dec. 14, 2022], Internet <URL: https://www.nio.com/nio-power>.

* cited by examiner

FIG. 5

| POWER SUPPLY DESTINATION VEHICLE | LOCATION INFORMATION AND MAP INFORMATION | CHARGING FEE [YEN] | ADDITIONAL COST [YEN] |
|---|---|---|---|
| SV1 | XXX | 1,000 | 1,000 |
| SV2 | YYY | 1,500 | 0 |
| ... | ... | ... | ... |

ADDITIONAL COSTS WILL BE INCURRED
IN ADDITION TO THE CHARGING FEE
DUE TO ENTERING PAY FACILITY.

CHARGING FEE: 1,000 YEN

ADDITIONAL COST: 1,000 YEN

APPROVE ADDITIONAL COSTS?

| YES | NO |

INFORMATION PROCESSING METHOD AND STORAGE MEDIUM

CROSS-REFERENCE TO RELATED APPLICATION

This application claims priority to Japanese Patent Application No. 2022-212690 filed on Dec. 28, 2022, incorporated herein by reference in its entirety.

BACKGROUND

1. Technical Field

The present disclosure relates to an information processing method and a storage medium.

2. Description of Related Art

Hitherto, there is known a service in which a power supply vehicle rushes to a target vehicle and supplies electric power to the target vehicle when a power supply request to the target vehicle is made on an application (see, for example, NIO LIMITED, "NIO Power", [online], 2022, [Searched on Dec. 14, 2022], Internet <URL: https://www.nio.com/nio-power>).

SUMMARY

In the related art described above, additional costs such as a cost for entering a pay parking lot when rushing to the vehicle may be incurred for accessing the vehicle to which electric power is to be supplied. In this case, trouble may occur with a customer regarding the payment amount.

In view of such circumstances, an object of the present disclosure is to reduce trouble with a customer regarding the payment amount.

An information processing method according to an embodiment of the present disclosure is an information processing method to be performed by an information processing device. The information processing method includes: acquiring position information of a power supply destination vehicle and map information when a power supply request is received from a user terminal; determining that an additional cost is to be incurred in a charging fee for a power supply source vehicle to enter a pay facility when determination is made that the power supply destination vehicle is in the pay facility based on the position information and the map information; notifying the user terminal about the additional cost; and dispatching the power supply source vehicle in response to detection that the user terminal has approved the additional cost.

A storage medium according to another embodiment of the present disclosure stores a program that causes a computer to perform operations including: transmitting, to an information processing device, a power supply request for requesting power supply to a power supply destination vehicle; receiving, from the information processing device, a notification that an additional cost is to be incurred in a charging fee for a power supply source vehicle to enter a pay facility when determination is made that the power supply destination vehicle is in the pay facility based on position information of the power supply destination vehicle and map information, and displaying the notification on a display unit; requesting a user to approve the additional cost on the display unit; notifying the information processing device that the additional cost has been approved; and displaying dispatch of the power supply source vehicle on the display unit.

According to the embodiments of the present disclosure, it is possible to reduce the trouble with the customer regarding the payment amount.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a diagram showing the data structure of the cost database (DB); and

FIG. 6 is a diagram showing an example of a screen displayed on the user terminal.

DETAILED DESCRIPTION OF EMBODIMENTS

Figure 1:
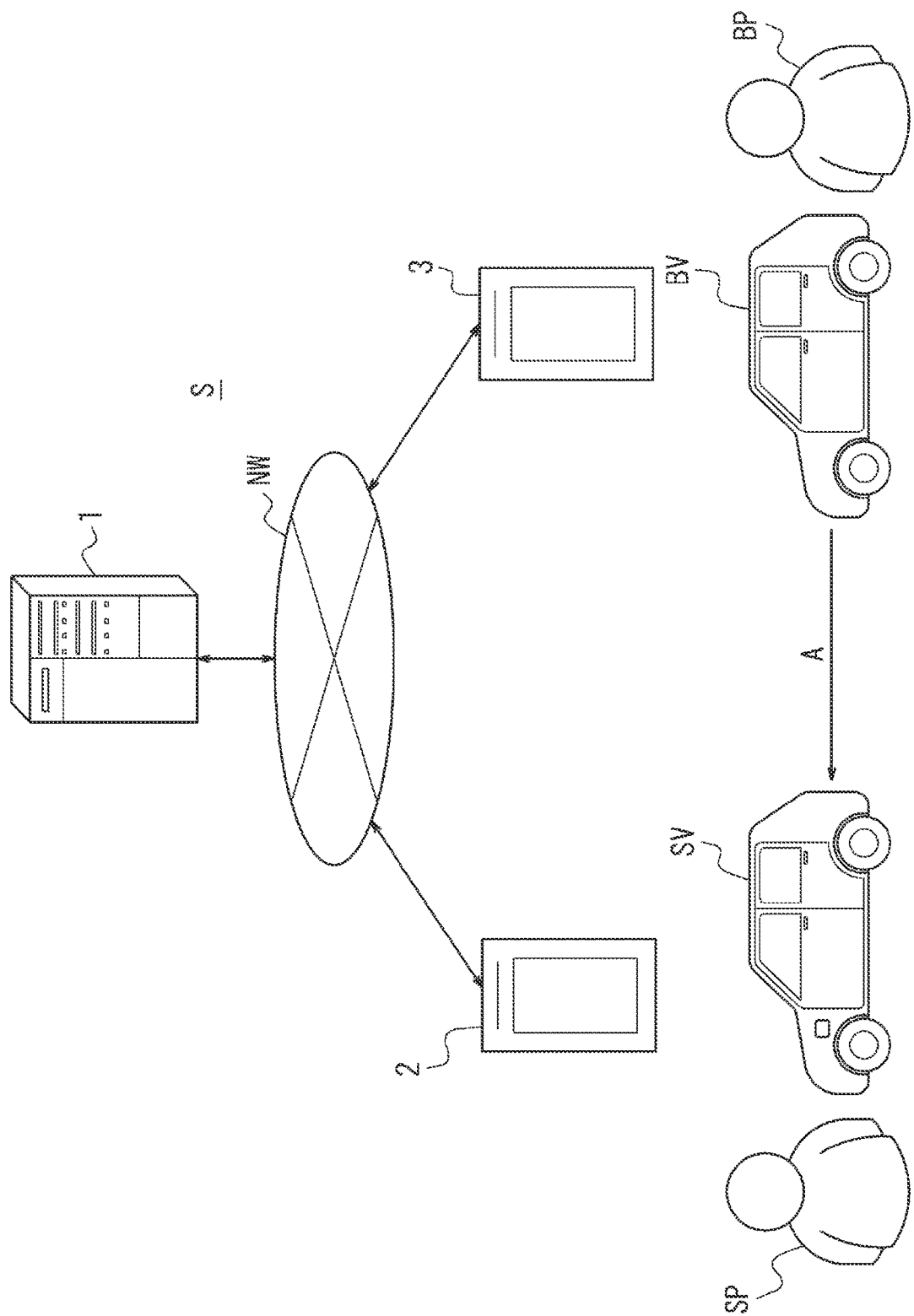
FIG. 1 is a schematic diagram of an information processing system.

FIG. 1 is a schematic diagram of an information processing system S according to the present embodiment. The information processing system S includes an information processing device 1, a user terminal 2, and a worker terminal 3 that can communicate with each other via a network NW. Network NW includes, for example, a mobile communication network, a fixed communication network, or the Internet.

The user terminal 2 is operated by the user SP. The user SP drives the power supply destination vehicle SV or rides in the power supply destination vehicle SV. The worker terminal 3 is operated by the worker BP. The worker BP drives the power supply source vehicle BV or rides in the power supply source vehicle BV. Power supply source vehicle BV moves in direction A to the position of power supply destination vehicle SV. The power supply source vehicle BV supplies electric power from the power supply source vehicle BV to the power supply destination vehicle SV. Here, as an example, each of the power supply destination vehicle SV and the power supply source vehicle BV is a battery electric vehicle including a battery, but is not limited to this.

In FIG. 1, one information processing device 1, one user terminal 2, and one worker terminal 3 are shown for the sake of simplicity of explanation. However, the numbers of the information processing devices 1, the user terminals 2, and the worker terminals 3 are not limited to this. For example, the processes executed by the information processing device 1 according to the present embodiment may be executed by a plurality of the information processing devices 1 disposed in a distributed manner.

The information processing device 1 is installed in facilities such as a data center. The information processing device 1 is, for example, a computer such as a server belonging to a cloud computing system or other computing systems.

Figure 2:
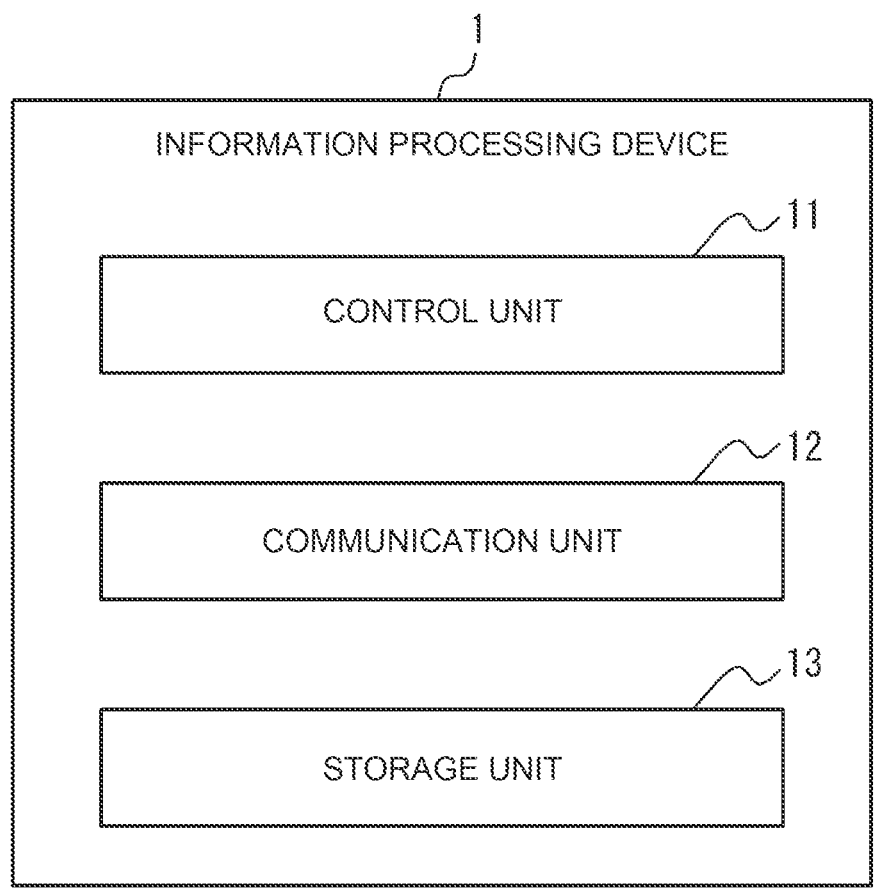
FIG. 2 is a block diagram showing the configuration of an information processing device.

In FIG. 2, the internal configuration of the information processing device 1 will be described in detail.

The information processing device 1 includes the control unit 11, the communication unit 12, and a storage unit 13.

The constituent components of the information processing device 1 are connected so as to be able to communicate with each other via a dedicated line, for example.

The control unit 11 includes, for example, one or more general-purpose processors including a Central Processing Unit (CPU) or a Micro Processing Unit (MPU). The control unit 11 may include one or more dedicated processors specialized for a specific process. The control unit 11 may include one or more dedicated circuits instead of the processor. The dedicated circuit may be, for example, a field-programmable gate array (FPGA) or an application-specific integrated circuit (ASIC). The control unit 11 may include an electronic control unit (ECU). The control unit 11 transmits and receives arbitrary information via the communication unit 12.

The communication unit 12 includes a communication module conforming to one or more wired or wireless local area network (LAN) standards for connecting to the network NW. The communication unit 12 may include modules corresponding to one or more mobile communication standards including Long Term Evolution (LTE), the fourth generation (4G), or the fifth generation (5G). The communication unit 12 may include a communication module and the like conforming to one or more short-range communication standards or specifications including Bluetooth (registered trademark), AirDrop (registered trademark), infrared data association (IrDA), ZigBee (registered trademark), FeliCa (registered trademark), or radio frequency identifier (RFID). The communication unit 12 transmits and receives information via the network NW.

The storage unit 13 includes a semiconductor memory, a magnetic memory, an optical memory, or a combination of at least two of them. However, the disclosure is not limited to this. The semiconductor memory is, for example, a random access memory (RAM) or a read-only memory (ROM). The RAM is, for example, a static random access memory (SRAM) or a dynamic random access memory (DRAM). The ROM is, for example, an electrically erasable programmable read-only memory (EEPROM). The storage unit 13 may function as, for example, a main storage device, an auxiliary storage device, or a cache memory. The storage unit 13 may store information on the result of analysis or processing by the control unit 11. The storage unit 13 may store various kinds of information and the like related to the operation or control of the information processing device 1. The storage unit 13 may store a system program, an application program, embedded software, and the like. The storage unit 13 may be provided outside the information processing device 1 and accessed from the information processing device 1. Storage unit 13 includes a cost DB.

The user terminal 2 is, for example, a mobile terminal such as a mobile phone, a smart phone, a wearable device, or a tablet. Alternatively, the user terminal 2 may be a general purpose device such as a PC, or a dedicated device. PC is an abbreviation for personal computer.

Figure 3:
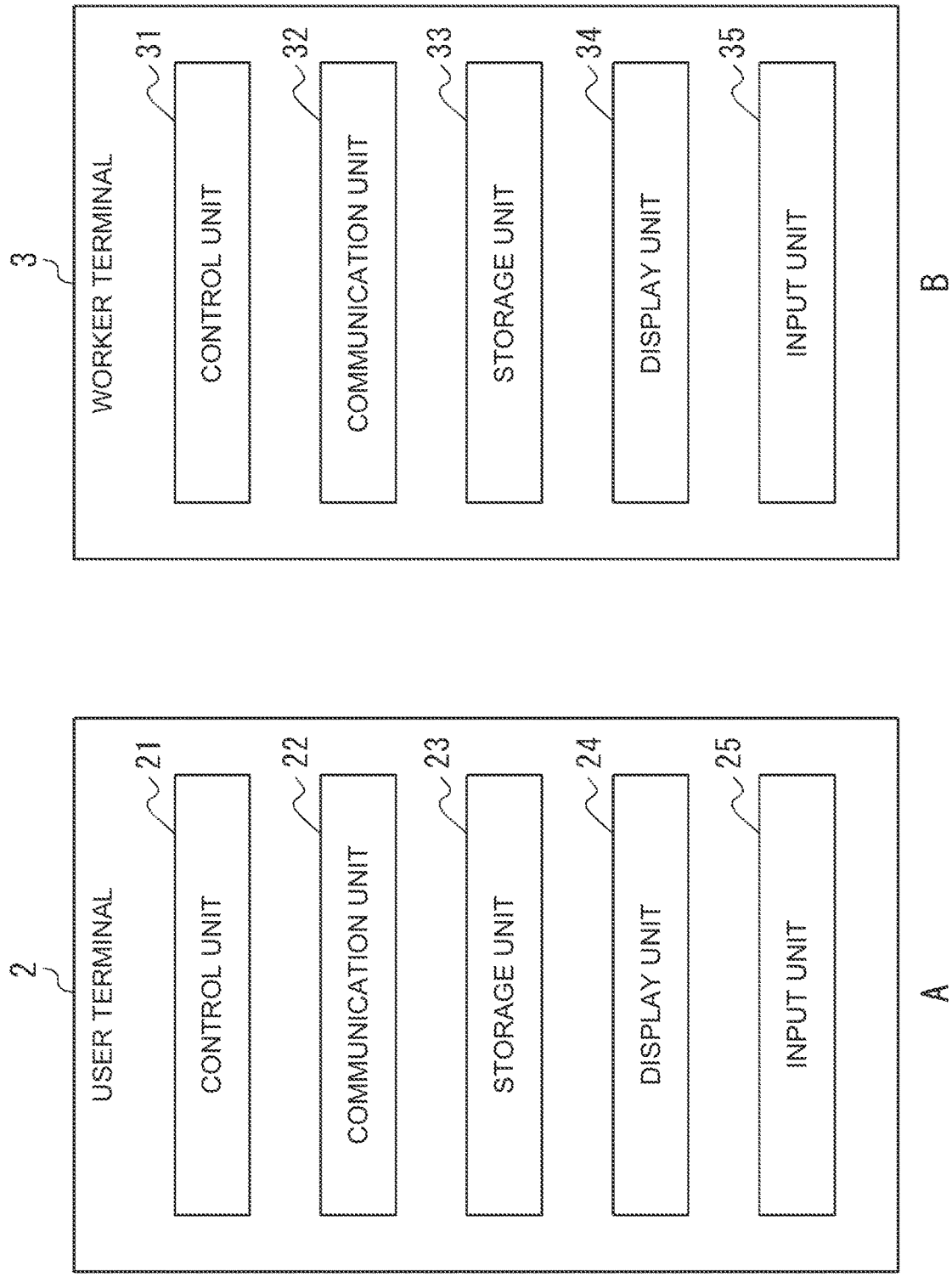
FIG. 3 is a block diagram showing the configuration of each of the user terminal and worker terminal.

In A in FIG. 3, the internal configuration of the user terminal 2 is explained in detail.

The user terminal 2 includes a control unit 21, a communication unit 22, a storage unit 23, a display unit 24 and an input unit 25. Each component of the user terminal 2 is communicably connected to each other via a dedicated line, for example.

The description of the hardware configuration of the control unit 21, the communication unit 22, and the storage unit 23 of the user terminal 2 is the same as the description of the hardware configuration of the control unit 11, the communication unit 12, and the storage unit 13 of the information processing device 1 may be identical. The description here is omitted.

The display unit 24 is, for example, a display. The display is, for example, an LCD or an organic EL display. LCD is an abbreviation for liquid crystal display. The term "EL" is an abbreviation for "electroluminescence". The display unit 24 may be connected to the user terminal 2 as an external output device instead of being provided in the user terminal 2. As a connection method, for example, any method such as a universal serial bus (USB), a high-definition multimedia interface (HDMI) (registered trademark), or Bluetooth (registered trademark) can be used.

The input unit 25 is, for example, a physical key, a capacitive key, a pointing device, a touch screen integrated with a display, or a microphone. The input unit 25 receives an operation of inputting information used for the operation of the user terminal 2. The input unit 25 may be connected to the user terminal 2 as an external input device instead of being provided in the user terminal 2. As a connection method, for example, any method such as a universal serial bus (USB), a high-definition multimedia interface (HDMI) (registered trademark), or Bluetooth (registered trademark) can be used. The term "USB" is an abbreviation for "universal serial bus". The term "HDMI (registered trademark)" is an abbreviation for "high-definition multimedia interface".

In B in FIG. 3, the internal configuration of the worker terminal 3 is explained in detail. The worker terminal 3 includes a control unit 31, a communication unit 32, a storage unit 33, a display unit 34 and an input unit 35. Each component of the worker terminal 3 is connected to each other so as to be able to communicate with each other via, for example, a dedicated line.

The description of the hardware configuration of the control unit 31, the communication unit 32, the storage unit 33, the display unit 34, and the input unit 35 of the worker terminal 3 is given in the control unit 21, the communication unit 22, and the storage unit 23 of the user terminal 2. The hardware configuration of the display unit 24 and the input unit 25 may be the same as the description. The description here is omitted.

Figure 4:
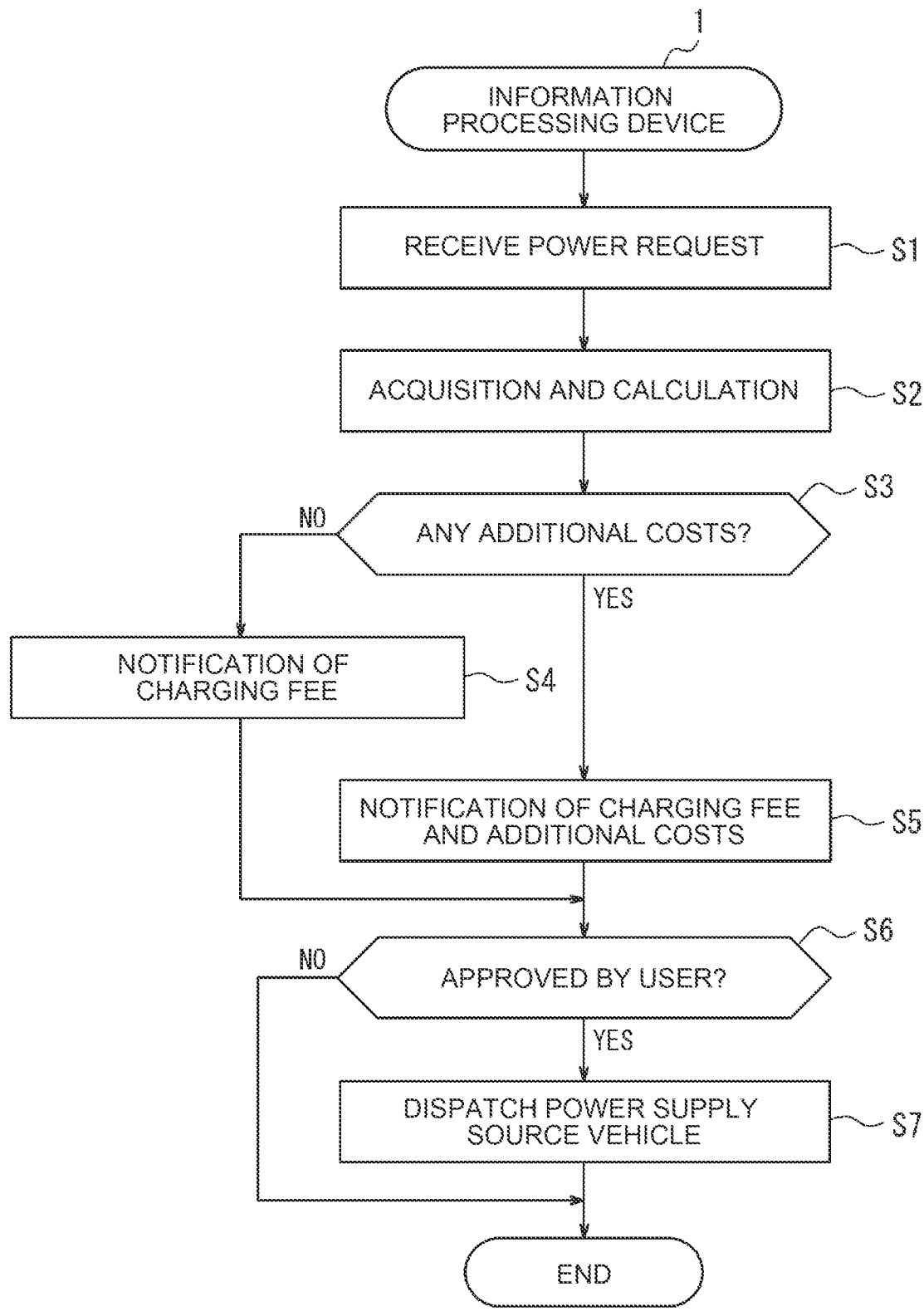
FIG. 4 is a flowchart showing the operation of the information processing device.

The information processing method by the information processing device 1 will be described in detail below with reference to FIG. 4. Here, as an example, a scene in which the user SP operates the user terminal 2 to request power supply to the power supply destination vehicle SV will be described.

At S1, the control unit 11 of the information processing device 1 receives a power supply request from the user terminal 2.

In S2, the control unit 11 acquires position information and map information of the power supply destination vehicle SV. Location information is obtained, for example, from the Global Positioning System (GPS). The location information may be determined from the location information of the user terminal 2. Map information is acquired from arbitrary storage means. As shown in FIG. 5, the control unit 11 stores position information and map information in association with the power supply destination vehicle SV. The control unit 11 calculates the charging fee. At least one of location information and map information may be used to calculate the charging fee. As shown in FIG. 5, the control unit 11 stores the charging fee in association with the power supply destination vehicle SV.

In S3, the control unit 11 determines whether or not the power supply destination vehicle SV is in the pay facility based on the position information and the map information. That is, the control unit 11 determines whether an additional cost will be incurred in the charging fee due to the entry of the power supply source vehicle BV into the pay facility. A pay facility is a place that requires payment to enter, such as a parking lot of an apartment building or a company, or a highway. As shown in FIG. 5, the control unit 11 stores the additional cost in association with the power supply destination vehicle SV.

As an additional example, the control unit 11 may obtain access permission to the payment information (for example, ETCX information) of the power supply destination vehicle SV when the user SP subscribes to the service of the present embodiment or at a timing before S3. The control unit 11 checks whether the power supply destination vehicle SV periodically or before S3 is stopped in a state in which the usage fee for the expressway or the parking lot has been paid. When the confirmation result is affirmative, the control unit 11 may determine that the power supply destination vehicle SV is in the pay facility.

When No in S3, the control unit 11 notifies the charging fee to the user terminal 2 in S4. The charging fee is equal to the user SP's payment amount.

When Yes in S3, the control unit 11 notifies the user terminal 2 of the charging fee and the additional cost in S5. The sum of the charging fee and the additional cost is equal to the user SP's payment amount. An example of a screen displayed on the display unit 24 of the user terminal 2 is shown in FIG. 6. User SP is requested to approve the additional cost.

As an additional or alternative example, the control unit 11 may notify the user terminal 2 that no additional cost will be incurred when charging outside the pay facility. At this time, the control unit 11 may propose to the user terminal 2 to move the power supply destination vehicle SV out of the pay facility. For example, the control unit 11 may suggest to the user terminal 2 to exit the expressway from the smart interchange when the power supply destination vehicle SV is on the expressway. The user SP chooses whether to adopt the proposal.

As an additional example or an alternative example, when the power supply destination vehicle SV is in the parking lot of an apartment building, company, or the like, the control unit 11 searches for a place in the surrounding area where the additional cost is relatively low, and supplies power at the found place may be proposed to do.

At S6, the control unit 11 determines whether or not the amount notified at S4 or S5 has been approved. When No in S6, the control unit 11 terminates the flow of FIG. 6. When Yes in S6, the control unit 11 allocates the power supply source vehicle BV to the power supply destination vehicle SV in S7. Alternatively, after S4, S7 may be executed without executing S6.

As an additional example or an alternative example, when the control unit 11 determines that an additional cost is incurred, the control unit 11 supplies power to a plurality of vehicles including the power supply destination vehicle SV within the pay facility, and divides the additional cost among the plurality of vehicles. As an additional example, the control unit 11 may propose (that is, the control unit may recommend) charging to a plurality of other vehicles within a predetermined range from the power supply destination vehicle SV.

As an additional example or an alternative example, the control unit 11 supplies power to any one of the power supply destination vehicles SV according to the limitation of the amount of the battery loaded in the power supply source vehicle BV or the vehicle type of the plurality of power supply destination vehicles SV and the time at which power is supplied.

As described above, according to the present embodiment, the operation of the control unit 11 of the information processing device 1 is to acquire the position information and the map information of the power supply destination vehicle SV when receiving the power supply request from the user terminal 2. If it is determined from the position information and the map information that the power supply destination vehicle SV is in the pay facility, it is determined that an additional cost will be incurred in the charging fee because the power supply source vehicle BV enters the pay facility; Informing the user terminal 2; and dispatching the power supply source vehicle BV upon detecting that the additional fee has been approved at the user terminal 2. With this configuration, the information processing device 1 can confirm with the user SP in advance that an additional cost will be incurred, so it is possible to reduce troubles with the customer regarding the payment amount.

Further, according to the present embodiment, the operation of the control unit 11 includes notifying the user terminal 2 that no additional cost will be incurred when charging outside the pay facility. With this configuration, the information processing device 1 can notify the user SP that there is an option to charge the battery without incurring additional costs, thereby improving the satisfaction level of the user SP.

Further, according to this embodiment, when it is determined that an additional cost will be incurred, the operation of the control unit 11 includes supplying power to a plurality of vehicles including the power supply destination vehicle SV within the pay facility, and dividing the additional cost among a plurality of vehicles to charge the additional cost. With this configuration, the information processing device 1 can divide the additional cost among a plurality of users, thereby reducing the amount borne by each user.

Further, according to the present embodiment, the operation of the control unit 11 includes, when it is determined that an additional cost is incurred, to suggest charging to another vehicle within a predetermined range from the power supply destination vehicle SV. With this configuration, the information processing device 1 can encourage the additional cost to be divided, and thus can assist in reducing the amount borne by each user.

Although the present disclosure has been described above based on the drawings and the embodiment, it should be noted that those skilled in the art may make various modifications and alterations thereto based on the present disclosure. Other changes may be made without departing from the scope of the present disclosure. For example, the functions included in each means or step can be rearranged so as not to be logically inconsistent, and a plurality of means or steps can be combined into one or divided.

For example, in the above-described embodiments, a program for executing all or part of the functions or processes of the information processing device 1, the user terminal 2, and the worker terminal 3 may be recorded in a computer-readable recording medium (a storage medium). The computer-readable recording medium includes a non-transitory computer-readable medium such as a magnetic recording device, an optical disc, a magneto-optical recording medium, or a semiconductor memory. Programs are distributed by, for example, selling, assigning, or lending portable recording media such as Digital Versatile Discs (DVDs) or Compact Disc Read Only Memory (CD-ROMs) on which the programs are recorded. Further, the distribution of the program may be performed by storing the program in a storage of a server and transmitting the program from the server to another computer. Further, the program may be provided as a program product. The present disclosure can also be realized as a program that can be executed by a processor.

What is claimed is:

1. An information processing method performed by an information processing device comprising a processor, an electric communication unit, and a memory storing a cost database and an electric map application, wherein the processing device is in electronic communication with a mobile power supply source vehicle for charging an electric vehicle, the processor configured to:

receive, via the communication unit, from a first user terminal, a power supply request associated with a power supply destination vehicle, wherein the destination vehicle is an electric vehicle and the power supply request comprises a request to supply electrical charging of one or more batteries of the electric vehicle, wherein the user terminal comprises a mobile computing device associated with the first user, wherein the user computing device is configured to execute an application for generating an interface for generating the power supply request, wherein the application includes global positioning system (GPS) data and logic and the power supply request automatically includes location information of the power supply destination vehicle;

periodically monitor, via the communication unit, based on the mobile computing devices associated with a plurality of other users, location information of each respective potential power supply destination vehicle of another user;

acquire, by the processor, based on the power supply request received from the first user terminal, the location information of the power supply destination vehicle using the global positioning system (GPS) data and logic and the map information retrieved from the memory;

determine, by the processor, based on the location information, that the power supply destination vehicle is located in a pay facility that will charge an additional cost for the power supply source vehicle to enter the pay facility;

determine, by the processor, location information of a second set of potential power supply destination vehicles, wherein the second set comprises one or more of the plurality of other users within a predetermined distance from the power supply destination vehicle;

based on the determination that the power supply destination vehicle of the first user is located in the pay facility and that an additional cost is to be charged by the power supply source vehicle to enter the pay facility, the processor is configured to send to the mobile computing device of the first user, for display on the interface, the following notifications indicating charging options:

a notification to the first user terminal indicating the charging fee for the power supply source vehicle and the additional cost, a notification to the first user terminal indicating a lower cost or no additional cost will be incurred for charging the power supply destination vehicle outside the pay facility, suggesting that the first user moves the power supply destination vehicle out of the pay facility, and a notification to the first user terminal indicating that the additional cost can be divided among the second set of the other users, receive, via the communication unit, a response from the first user terminal selecting at least one of the foregoing charging options;

determine, via the processor, whether the charging fee notified has been approved, and in a case where determination is made that the charging fee has been approved, dispatch the power supply source vehicle to the power supply destination vehicle, supply power to any of power supply destination vehicles based on an amount of a battery loaded on the power supply source vehicle or a vehicle type of the any of power supply destination vehicles and a time at which the power is supplied, and collect, not collect, or divide, by the processor, the additional cost based on the selection by the first user.

2. The information processing method according to claim 1, wherein the pay facility is a place that requires payment to enter including a parking lot of an apartment building or a company, or a highway.

3. A non-transitory storage medium storing a program that causes a computer to perform operations comprising:

transmitting, to an information processing device comprising a processor, an electric communication unit, and a memory storing a cost database and an electric map application, a power supply request for requesting power supply to a power supply destination vehicle, wherein the processing device is in electronic communication with a mobile power supply source vehicle for charging an electric vehicle;

receiving, via the communication unit, from a first user terminal, the power supply request associated with the power supply destination vehicle, wherein the destination vehicle is an electric vehicle and the power supply request comprises a request to supply electrical charging of one or more batteries of the electric vehicle, wherein the user terminal comprises a mobile computing device associated with the first user, wherein the user computing device is configured to execute an application for generating an interface for generating the power supply request, wherein the application includes global positioning system (GPS) data and logic and the power supply request automatically includes location information of the power supply destination vehicle;

periodically monitoring, via the communication unit, based on the mobile computing devices associated with a plurality of other users, location information of each respective potential power supply destination vehicle of another user;

acquiring, by the processor, based on the power supply request received from the first user terminal, the location information of the power supply destination vehicle using the global positioning system (GPS) data and logic and map information retrieved from the memory;

determining, by the processor, based on the location information, that the power supply destination vehicle is located in a pay facility that will charge an additional cost for the power supply source vehicle to enter the pay facility;

determining, by the processor, location information of a second set of potential power supply destination vehicles, wherein the second set comprises one or more of the plurality of other users within a predetermined distance from the power supply destination vehicle;

based on the determination that the power supply destination vehicle of the first user is located in the pay facility and that an additional cost is to be charged by the power supply source vehicle to enter the pay facility, sending to the mobile computing device of the first user, for display on the interface, the following notifications indicating charging options:

a notification to the first user terminal indicating the charging fee for the power supply source vehicle and the additional cost, a notification to the first user terminal indicating a lower cost or no additional cost will be incurred for charging the power supply destination vehicle outside the pay facility, suggesting that the first user moves the power supply destination vehicle out of the pay facility, and a notification to the first user terminal indicating that the additional cost can be divided among the second set of the other users, receiving, via the communication unit, a response from the first user terminal selecting at least one of the foregoing charging options;

determining, via the processor, whether the charging fee notified has been approved, and in a case where determination is made that the charging fee has been approved, dispatching the power supply source vehicle to the power supply destination vehicle, supplying power to any of power supply destination vehicles based on an amount of a battery loaded on the power supply source vehicle or a vehicle type of the any of power supply destination vehicles and a time at which the power is supplied, and collecting, not collecting, or dividing, by the processor, the additional cost based on the selection by the first user.

* * * * *